July 21, 1970  J. H. SCHILDMEIER  3,521,495
BALANCING MACHINE SAFETY GUARD ASSEMBLY
Filed Feb. 14, 1968
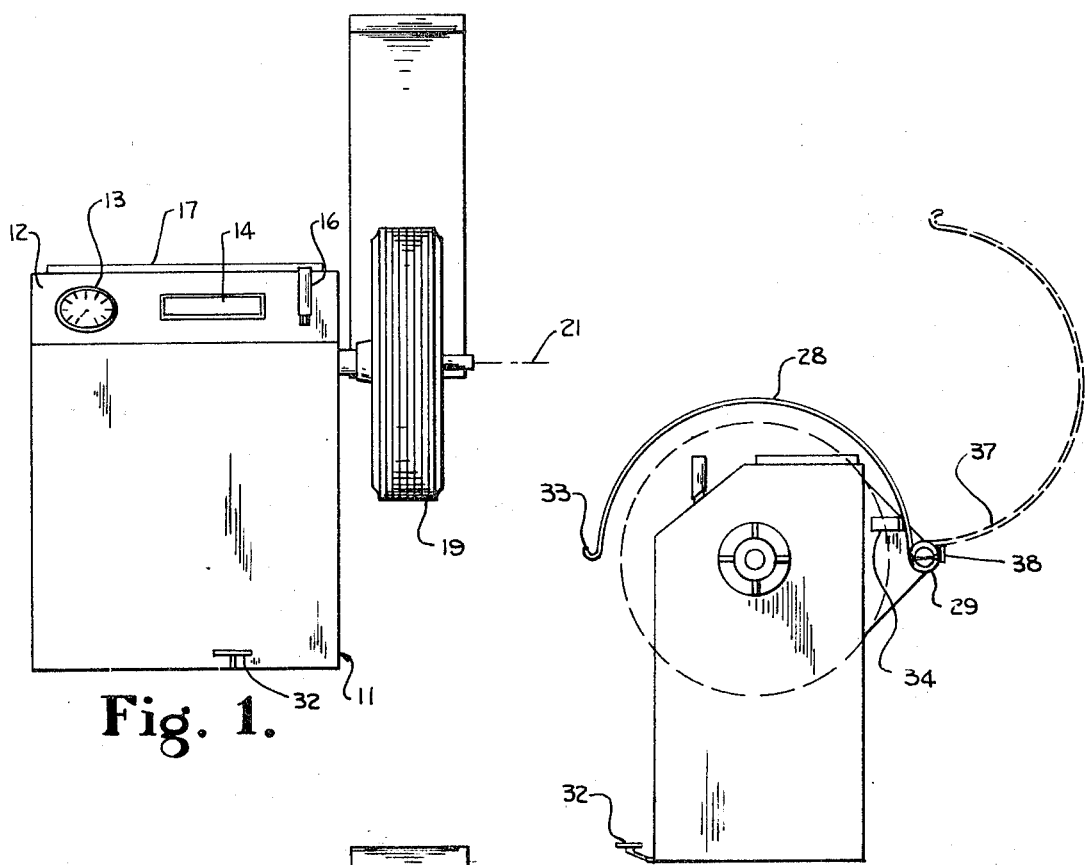
Fig. 1.
Fig. 2.
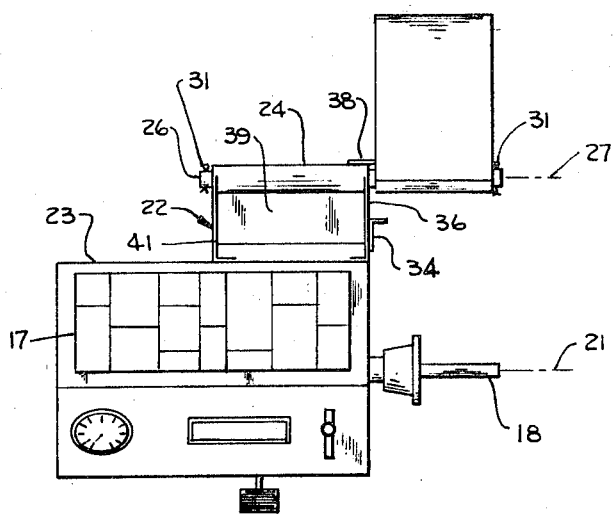
Fig. 3.
INVENTOR
JOHN HENRY SCHILDMEIER
BY
Woodard, Weikart, Emhardt & Naughton
Attorneys

3,521,495
BALANCING MACHINE SAFETY GUARD ASSEMBLY
John Henry Schildmeier, 6038 Crow's Nest Drive, Indianapolis, Ind. 46208
Filed Feb. 14, 1968, Ser. No. 705,422
Int. Cl. G01p 1/00
U.S. Cl. 73—487                    2 Claims

ABSTRACT OF THE DISCLOSURE

A wheel dynamic balancing machine with a bracket fixed to a back wall thereof mounting a pivot shaft parallel to the wheel spinning axis. A semi-circular shield pivotally mounted to the shaft and movable from position down over the spinning wheel to a position upward and to the rear thereof for full access of the wheel to the workman.

BACKGROUND OF THE INVENTION

Field of the invention

This invention relates generally to dynamic balancing machines for wheels, and more particularly to such machine with a safety guard of effective performance and convenient use.

Description of the prior art

Wheel balancing machines of the motorized type have long been used for both statically and dynamically balancing vehicle wheel and tire assemblies. Occasionally such machines are used on assemblies wherein the tire is dirty or wet or contains foreign matter in the tread, particularly stone. Such machines can spin a wheel at a rate comparable to a vehicle speed of the order of 100 miles per hour. Dirt, water and foreign matter are readily dislodged from the wheel at such rotational speeds with annoying and sometimes hazardous results.

Guards have been devised for employment on such machines but are inconvenient to use because of obstruction of either the wheel or the machine to access by the operator during the balancing operation. The present invention overcomes these shortcomings of known prior art.

SUMMARY

Described briefly, in a typical embodiment of the present invention, a balancing machine has a semi-circular shield pivotally mounted to a bracket thereon, the pivotal axis being parallel to the spin axis of the wheel. The shield is thereby pivotal from a guard position protecting the operator and others in the area, to an access position wherein the guard permits full accessibility by the operator to the machine and the wheel at all times other than when the wheel is to be spun.

BRIEF DESCRIPTION OF THE DRAWING

The full nature of the invention will be understood from the accompanying drawings and the following description and claims.

FIG. 1 is a front elevational view of the typical embodiment of the present invention with the guard elevated in the access position.

FIG. 2 is a side elevational view thereof with the tire shown in dotted outline and the guard in the guard position, the dotted outline showing the guard in the raised or access position.

FIG. 3 is a top plan view of the apparatus in the condition shown in FIG. 1, but with the wheel and tire assembly removed.

DESCRIPTION OF THE PREFERRED EMBODIMENT

Referring now to the drawings in detail, the balancing machine 11 has an inclined upper front panel 12 with a speed indicator 13, a balance indicator 14 and a spin control handle 16. A tray 17 is provided on top of the machine with a plurality of compartments therein for various weights of an assortment. A shaft assembly 18 extends from the right-hand side of the machine for reception of a wheel and tire assembly 19 thereon and rotation thereof about the horizontal axis 21.

A bracket 22 is affixed to the rear wall 23 of the machine according to the illustrated embodiment of the invention and has a tube 24 at the rear margin thereof. A tube 26 is received in tube 24 and projects therefrom with its axis 27 parallel to the axis 21, the projecting portion being aligned with the mounted wheel and tire assembly.

A cylindrical shield 28 has a tube 29 integral therewith at one end thereof, and where the shield is made of suitable material, the tube can be formed directly therein. This tube is received on tube 26 so that the shield is pivotable from the closed or guard position shown in FIG. 2 in the solid outline, to the open or access position shown by the dotted outline in FIG. 2. When in the closed position, the cylindrical axis of the shield is co-linear with the shaft axis 21. Also when in the closed position the front and rear lower margins of the shield are virtually coplanar with the shaft axis 21. The bracket, tube 26, and shield 28 are all axially retained by the cotter pins 31 received in opposite ends of tube 26 and perpendicular to the axis 27 thereof.

In the operation of the machine, the shield is raised to the access position to facilitate mounting of the wheel on the shaft assembly. When the wheel is secured, the shield is lowered to the guard position of FIG. 2 and the preliminary balancing operations can now be performed. With the shield up to the side and rear of the machine 11, there is complete accessibility by the operator to all of the instruments and controls as well as to the full assortment of balancing weights in tray 17. Also there is complete accessibility to the wheel and tire assembly permitting ease of removal of old weights and installation of new weights.

When the wheel is to be spun, the shield is simply lowered to the position shown in FIG. 2, and the spinning operation is commenced. When spinning is completed, after stopping of the wheel by application of the brake pedal 32, the shield can again be raised to the position shown by the dotted outline for further application of weights or removal of the wheel, as desired.

In the illustrated embodiment of the invention, the bracket, tubes, and shield are made of steel and the forward or front end of the shield is curved upwardly as at 33 to provide a convenient handle. An angle bar 34 is affixed to the bracket side member 36 to abuttingly engage the inside face of the shield at 37 when the shield is lowered, thus providing a stop. A bar 38 is affixed to the bracket tube 24 behind the shield and provides a back stop for the shield in the position shown by the dotted outline in FIG. 2. A horizontal shelf 39 is provided between the sidewalls 36 and 41 of the bracket and provides a convenient place to place one or more of the cones most often used in balancing operations.

While the material employed in the illustrated embodiment is steel, other materials may also be used, including possibly plastics.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention claimed is:
1. The combination comprising:
a wheel balancing machine having a wheel spinning shaft;
a shield connected to said machine and pivotable between a guard position and an access position, the pivotal axis being parallel to the axis of said shaft; said machine having indicator means facing the front, with said shaft extending to the side, and said guard position of said shield being at the side of said machine and over a wheel and tire assembly mounted on asid shaft, said pivotal axis being spaced behind said shaft axis whereby said access position is upward and to the rear of said guard position, whereby the entire frontal and side area of the machine and the wheel and tire assembly mounted thereon are readily accessible to the operator;
bracket means affixed to the rear of said machine;
a first stationary tube affixed to said bracket means behind said machine;
a second tube received in said first tube and rotatable theerin on the axis thereof, and extending axially therefrom;
a third tube affixed to said shield and received on said second tube and rotatable on the axis thereof;
and cotter pins in opposite ends of said second tube and extending transversely therethrough and retaining said first and third tubes thereon, the axes of said tubes providing said pivotal axis.

2. The combination of claim 1 wherein: said bracket includes a storage shelf thereon.

References Cited
UNITED STATES PATENTS

| | | | |
|---|---|---|---|
| 1,251,251 | 12/1917 | Lindeburg | 74—609 |
| 1,446,823 | 2/1923 | Breyer | 74—613 |
| 1,563,887 | 12/1925 | Weispetat | 77—55 |
| 2,527,898 | 10/1950 | Townshend | 73—472 |
| 2,547,764 | 4/1951 | Lindenberg et al. | 73—470 |

JAMES J. GILL, Primary Examiner

H. GOLDSTEIN, Assistant Examiner

U.S. Cl. X.R.

74—609